United States Patent
Kim (10) Patent No.: US 9,065,647 B2
(45) Date of Patent: Jun. 23, 2015

(54) METHOD AND APPARATUS OF TRANSMITTING CONTROL INFORMATION IN A WIRELESS COMMUNICATION SYSTEM

(75) Inventor: Hak Seong Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 59 days.

(21) Appl. No.: 13/522,014

(22) PCT Filed: Feb. 25, 2011

(86) PCT No.: PCT/KR2011/001352
§ 371 (c)(1),
(2), (4) Date: Jul. 12, 2012

(87) PCT Pub. No.: WO2011/105857
PCT Pub. Date: Sep. 1, 2011

(65) Prior Publication Data
US 2012/0307733 A1   Dec. 6, 2012

Related U.S. Application Data

(60) Provisional application No. 61/307,867, filed on Feb. 25, 2010.

(51) Int. Cl.
*H04L 1/18* (2006.01)
*H04L 1/16* (2006.01)
*H04L 1/00* (2006.01)
*H04L 5/00* (2006.01)

(52) U.S. Cl.
CPC ............ *H04L 1/1671* (2013.01); *H04L 1/0031* (2013.01); *H04L 1/1854* (2013.01); *H04L 5/0007* (2013.01); *H04L 5/0053* (2013.01)

(58) Field of Classification Search
None
See application file for complete search history.

(56) References Cited

U.S. PATENT DOCUMENTS

| | | | |
|---|---|---|---|
| 2009/0042558 A1 | 2/2009 | Shen et al. | |
| 2009/0245198 A1 | 10/2009 | Tiirola et al. | |
| 2009/0274100 A1* | 11/2009 | Montojo et al. | 370/328 |
| 2010/0040005 A1 | 2/2010 | Kim et al. | |
| 2011/0058505 A1* | 3/2011 | Pan et al. | 370/280 |
| 2011/0205955 A1* | 8/2011 | Xu et al. | 370/315 |
| 2011/0280169 A1* | 11/2011 | Seo et al. | 370/311 |

* cited by examiner

Primary Examiner — Huy D Vu
Assistant Examiner — Bao G Nguyen
(74) Attorney, Agent, or Firm — Lee, Hong, Degerman, Kang & Waimey (57) ABSTRACT

The present invention is directed to a wireless communication, more specifically to a method and apparatus of transmitting control information via a PUCCH in the wireless communication system, which comprises generating channel quality information and ACK/NACK information; and transmitting the channel quality information and the ACK/NACK information together via the PUCCH at a subframe, the subframe including a plurality of SC-FDMA symbols, wherein if SRS transmission is not configured at the subframe, all SC-FDMA symbols of the subframe are used for the transmission of the PUCCH, wherein if the SRS transmission is configured at the subframe, last SC-FDMA symbol of the subframe is not used for transmission of the PUCCH.

10 Claims, 7 Drawing Sheets

PUCCH format 1a and 1b structure (normal CP case)

Fig. 6

PUCCH format 1a and 1b structure (extended CP case)

Fig. 7

PUCCH format 2, 2a and 2b structure (normal CP case)

Fig. 8

PUCCH format 2,2a and 2b structure (extended CP case)

METHOD AND APPARATUS OF TRANSMITTING CONTROL INFORMATION IN A WIRELESS COMMUNICATION SYSTEM

CROSS-REFERENCE TO RELATED APPLICATIONS

This application is the National Stage filing under 35 U.S.C. 371 of International Application No. PCT/KR2011/001352, filed on Feb. 25, 2011, which claims the benefit of U.S. Provisional Application Ser. No. 61/307,867, filed on Feb. 25, 2010, the contents of which are all incorporated by reference herein in their entirety.

TECHNICAL FIELD

The present invention is directed to a wireless communication system, more specifically to a method and apparatus of transmitting control information in a wireless communication system.

BACKGROUND ART

Radio communication systems have been diversified in order to provide various types of communication services such as voice or data services. In general, a radio communication system is a multiple access system capable of sharing available system resources (bandwidth, transmit power or the like) so as to support communication with multiple users. Examples of the multiple access system include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and the like.

DISCLOSURE OF INVENTION

Technical Problem

An object of the present invention devised to solve the problem lies on a method and apparatus for transmitting control information when a plurality of control information need to be transmitted simultaneously in a wireless communication system.

Another object of the present invention devised to solve the problem lies on a method and apparatus for efficiently transmitting ACK/NACK(A/N) and CQI simultaneously.

A further object of the present invention devised to solve the problem lies on a method and apparatus for constructing a search space so as to efficiently transmit a control channel.

Solution to Problem

In a aspect of the invention, a method of transmitting control information via a physical uplink control channel (PUCCH) in a wireless communication system is provided, in which the method comprises: generating channel quality information and acknowledgement/negative acknowledgement (ACK/NACK) information; and transmitting the channel quality information and the ACK/NACK information together via the PUCCH at a subframe, the subframe including a plurality of single carrier frequency division multiple access (SC-FDMA) symbols, wherein if sounding reference signal (SRS) transmission is not configured at the subframe, all SC-FDMA symbols of the subframe are used for the transmission of the PUCCH, wherein if the SRS transmission is configured at the subframe, last SC-FDMA symbol of the subframe is not used for transmission of the PUCCH.

Preferably, the control information includes at least one of channel quality indicator (CQI), precoding matrix indicator (PMI) and rank indication (RI).

Preferably, the method further comprises: joint coding the channel quality information and the ACK/NACK information; and mapping the joint coded information to SC-FDMA symbols of the PUCCH.

Preferably, the ACK/NACK information is embedded in one or more SC-FDMA symbols for reference signal on the PUCCH.

Preferably, the channel quality information and the ACK/NACK information is transmitted together via PUCCH format 2.

Preferably, the method further comprises: transmitting SRS via the last SC-FDMA symbol at the subframe.

In an another aspect of the invention, an apparatus configured to transmit control information via a physical uplink control channel (PUCCH) in a wireless communication system is provided, in which the apparatus comprises: a radio frequency (RF) unit; and a processor, wherein the processor is configured to generate channel quality information and acknowledgement/negative acknowledgement (ACK/NACK) information, and to transmit the channel quality information and the ACK/NACK information together via the PUCCH at a subframe, the subframe including a plurality of single carrier frequency division multiple access (SC-FDMA) symbols, wherein if sounding reference signal (SRS) transmission is not configured at the subframe, all SC-FDMA symbols of the subframe are used for the transmission of the PUCCH, wherein if the SRS transmission is configured at the subframe, last SC-FDMA symbol of the subframe is not used for transmission of the PUCCH.

Preferably, the control information includes at least one of channel quality indicator (CQI), precoding matrix indicator (PMI) and rank indication (RI).

Preferably, the processor is further configured to joint code the channel quality information and the ACK/NACK information, and to map the joint coded information to SC-FDMA symbols of the PUCCH.

Preferably, the ACK/NACK information is embedded in one or more SC-FDMA symbols for reference signal on the PUCCH.

Preferably, the channel quality information and the ACK/NACK information is transmitted together via PUCCH format 2.

Preferably, the processor is further configured to transmit SRS via the last SC-FDMA symbol at the subframe.

Advantageous Effects of Invention

According to the present invention, it is possible to efficiently transmit a plurality of control information simultaneously.

It is to be understood that the advantages that can be obtained by the present invention are not limited to the aforementioned advantage and other advantages which are not mentioned will be apparent from the following description to the person with an ordinary skill in the art to which the present invention pertains.

BRIEF DESCRIPTION OF DRAWINGS

The accompanying drawings, which are included to provide a further understanding of the invention, illustrate embodiments of the invention and together with the description serve to explain the principle of the invention.

In the drawings.

MODE FOR THE INVENTION

The following technologies may be utilized in various radio access systems such as a Code Division Multiple Access (CDMA) system, a Frequency Division Multiple Access (FDMA) system, a Time Division Multiple Access (TDMA) system, an Orthogonal Frequency Division Multiple Access (OFDMA) system, or a Single Carrier Frequency Division Multiple Access (SC-FDMA) system. The CDMA system may be implemented as radio technology such as Universal Terrestrial Radio Access (UTRA) or CDMA2000. The TDMA system may be implemented as radio technology such as Global System for Mobile communications (GSM)/General Packet Radio Service (GPRS)/Enhanced Data Rate for GSM Evolution (EDGE). The OFDMA system may be implemented as radio technology such as IEEE 802.11 (Wi-Fi), IEEE 802.16 (WiMAX), IEEE 802-20 or E-UTRA (Evolved UTRA). The UTRA system is part of the Universal Mobile Telecommunications System (UMTS) standard. A 3rd Generation Partnership Project Long Term Evolution (3GPP LTE) communication system is part of the E-UMTS (Evolved UMTS) standard, which employs an OFDMA system in downlink and employs an SC-FDMA system in uplink. LTE-A (Advanced) is an evolved version of 3GPP LTE.

In order to clarify the description, the 3GPP LTE/LTE-A will be focused upon, but the technical scope of the present invention is not limited thereto. It should be noted that specific terms disclosed in the present invention are proposed for convenience of description and better understanding of the present invention and these terms may be replaced with other terms within the technical scope or spirit of the present invention.

Figure 1:
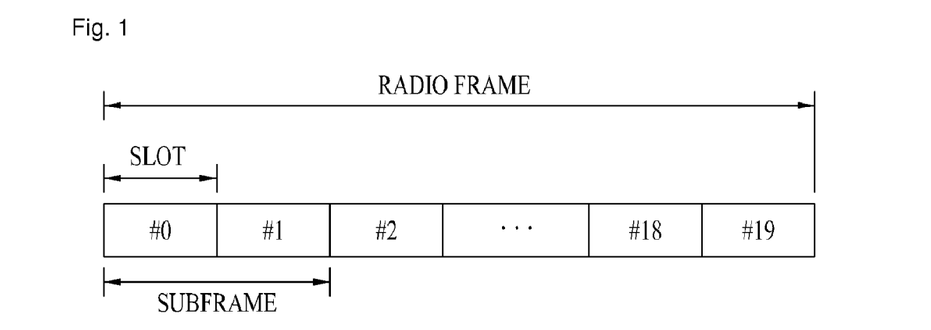
FIG. 1 is a diagram showing an exemplary structure of a radio frame of a 3GPP system.

FIG. 1 shows an exemplary structure of radio frame.

Referring to FIG. 1, a radio frame includes 10 subframes. A subframe includes two slots in time domain. A time for transmitting one subframe is defined as a transmission time interval (TTI). For example, one subframe may have a length of 1 millisecond (ms), and one slot may have a length of 0.5 ms. One slot includes a plurality of orthogonal frequency division multiplexing (OFDM) symbols in time domain. Since the 3GPP LTE uses the OFDMA in the downlink, the OFDM symbol is for representing one symbol period. The OFDM symbol may also be referred to as an SC-FDMA symbol or a symbol period. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

Figure 2:
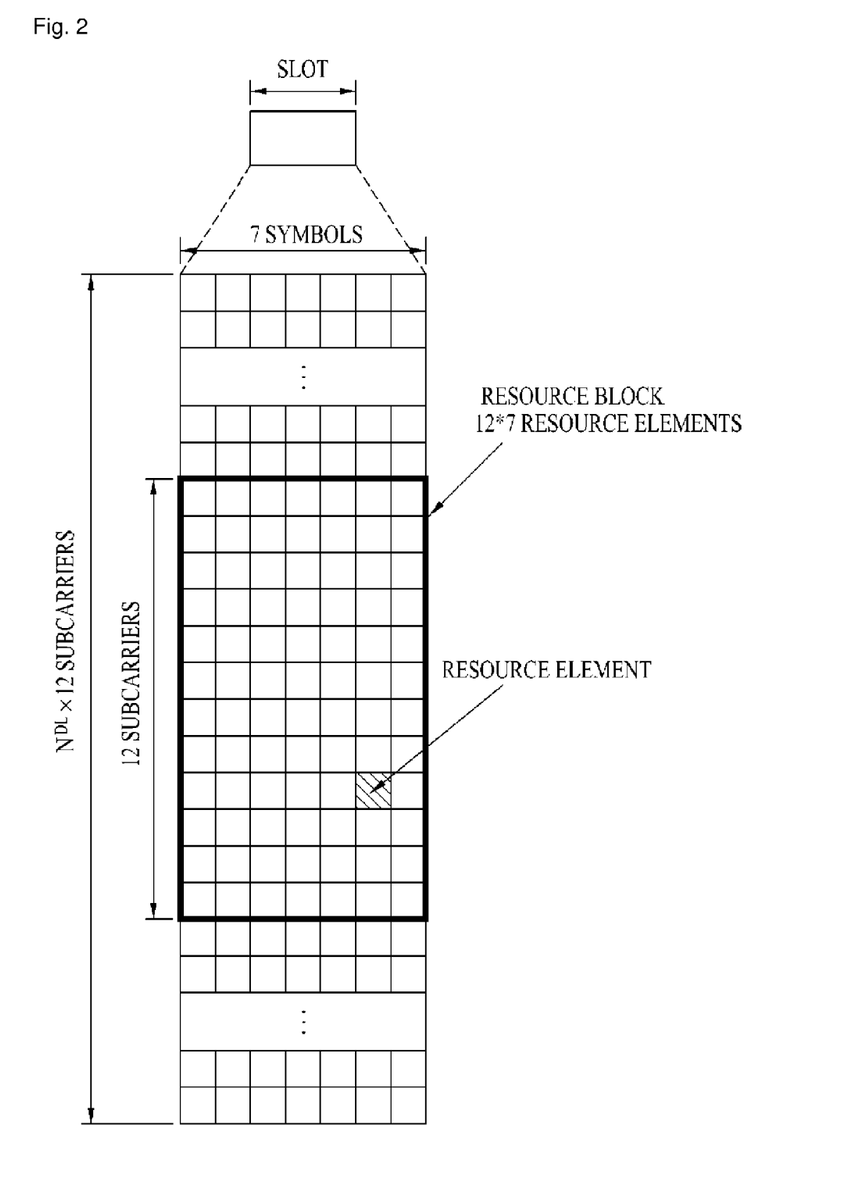
FIG. 2 is a diagram showing a resource grid of a downlink slot.

FIG. 2 shows a resource grid for one downlink slot.

Referring to FIG. 2, a downlink slot includes a plurality of OFDM symbols in time domain. It is described herein that one downlink slot includes 7 OFDM symbols, and one resource block (RB) includes 12 subcarriers in frequency domain as an example. However, the present invention is not limited thereto. Each element on the resource grid is referred to as a resource element (RE). One RB includes 12×7 REs. The number $N_{DL}$ of RBs included in the downlink slot depends on a downlink transmit bandwidth. The structure of an uplink slot may be same as that of the downlink slot.

Figure 3:
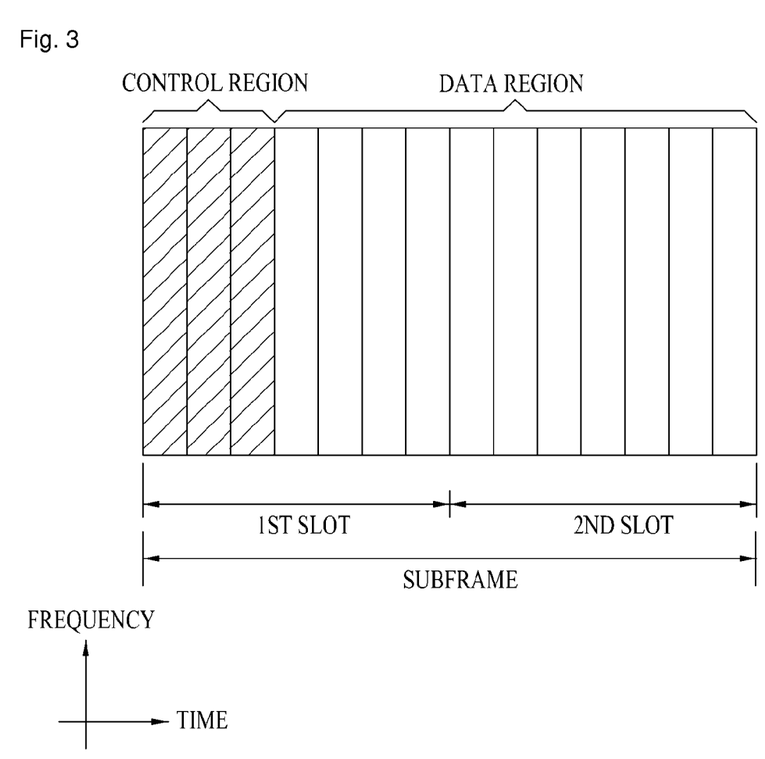
FIG. 3 is a diagram showing an exemplary structure of a downlink frame.

FIG. 3 shows an exemplary structure of downlink structure.

Referring to FIG. 3, a maximum of three OFDM symbols located in a front portion of a first slot within a subframe correspond to a control region to be assigned with a control channel. The remaining OFDM symbols correspond to a data region to be assigned with a physical downlink shared chancel (PDSCH). Examples of downlink control channels used in the 3GPP LTE includes a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative-acknowledgment (NACK) signal. Control information transmitted through the PDCCH is referred to as downlink control information (DCI). The DCI includes uplink or downlink scheduling information or includes an uplink transmit (Tx) power control command for arbitrary UE groups.

The PDCCH may carry a transport format and a resource allocation of a downlink shared channel (DL-SCH), resource allocation information of an uplink shared channel (UL-SCH), paging information on a paging channel (PCH), system information on the DL-SCH, a resource allocation of an upper-layer control message such as a random access response transmitted on the PDSCH, a set of Tx power control commands on individual UEs within an arbitrary UE group, a Tx power control command, activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined according to a correlation between the number of CCEs and the coding rate provided by the CCEs. The BS determines a PDCCH format according to a DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging indicator identifier (e.g., paging- RNTI (P-RNTI)) may be masked to the CRC. If the PDCCH is for system information (more specifically, a system information block (SIB) to be described below), a system information identifier and a system information RNTI (SI-RNTI) may be masked to the CRC. To indicate a random access response that is a response for transmission of a random access preamble of the UE, a random access-RNTI (RA-RNTI) may be masked to the CRC.

Figure 4:
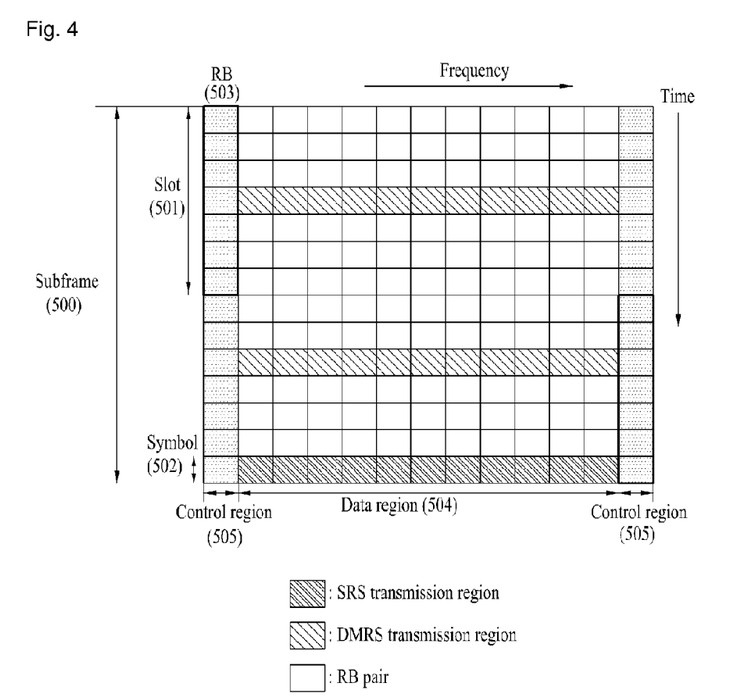
FIG. 4 is a diagram showing an exemplary structure of an uplink subframe.

FIG. 4 is a diagram showing an exemplary structure of an uplink subframe used in an LTE system.

Referring to FIG. 4, the uplink subframe 500 includes a plurality of slots (e.g., two) 501. Each slot may include SC-FDMA symbols 502, the number of which varies according to the length of a CP. For example, in the case of a normal CP, a slot may include seven SC-FDMA symbols. A Resource Block (RB) 503 is a resource allocation unit corresponding to 12 subcarriers by 1 slot. An uplink subframe is divided into a data region 504 and a control region 505 in a frequency region. The data region includes a PUSCH and is used to transmit a data signal such as voice. The control region includes a PUCCH and is used to transmit control information. The PUCCH includes an RB pair (e.g., m=0, 1, 2, 3) located at both ends of the data region on the frequency axis and hops between slots. The PUCCH for one UE is allocated to an RB pair in a subframe. RBs belonging to the RB pair occupy different subcarriers in respective two slots. The RB pair allocated to the PUCCH is frequency-hopped in a slot boundary. The control information includes ACK/NACK(A/N), Channel Quality Indicator (CQI), Precoding Matrix Indicator (PMI) and Rank Indication (RI).

Sounding Reference Signal (SRS) is primarily used for channel quality estimation to enable frequency-selective scheduling on the uplink. However, SRS can be used for other purposes such as to enhance power control or to support various start-up functions for UEs not recently scheduled. Some examples include initial Modulation and Coding Scheme (MCS) selection, initial power control for data transmissions, timing advance, and frequency semi-selective scheduling in which the frequency resource is assigned selectively for the first slot of a subframe and hops pseudo-randomly to a different frequency in the second slot. In addition, SRS can be used for downlink channel quality estimation under an assumption that a wireless channel is reciprocal between the uplink and downlink. This assumption is especially valid in a time division duplex (TDD) system where the uplink and downlink share the same frequency spectrum and are separated in time domain.

Subframes in which SRSs are transmitted by any UE within a cell are indicated by cell-specific broadcast signaling. A 4-bit cell-specific parameter 'srsSubframeConfiguration' indicates 15 possible sets of subframes in which SRS may be transmitted within each radio frame. This configurability provides flexibility in adjusting a SRS overhead depending on the deployment scenario. 16th configuration switches the SRS off completely in the cell, which may for example be appropriate for a cell serving primarily high-speed UEs. SRS transmissions are always in the last SC-FDMA symbol in the configured subframes. Thus the SRS and DeModulation Reference Signal (DM RS) are located in different SC-FDMA symbols. PUSCH data transmission is not permitted on the SC-FDMA symbol designated for SRS, resulting in a worst-case sounding overhead (with an SRS symbol in every subframe) of ~7%.

TABLE 1

| srs-SubframeConfig | Binary | Configuration Period $T_{SFC}$ (subframes) | Transmission offset $\Delta_{SFC}$ (subframes) |
|---|---|---|---|
| 0 | 0000 | 1 | {0} |
| 1 | 0001 | 2 | {0} |
| 2 | 0010 | 2 | {1} |
| 3 | 0011 | 5 | {0} |
| 4 | 0100 | 5 | {1} |
| 5 | 0101 | 5 | {2} |
| 6 | 0110 | 5 | {3} |
| 7 | 0111 | 5 | {0, 1} |
| 8 | 1000 | 5 | {2, 3} |
| 9 | 1001 | 10 | {0} |
| 10 | 1010 | 10 | {1} |
| 11 | 1011 | 10 | {2} |
| 12 | 1100 | 10 | {3} |
| 13 | 1101 | 10 | {0, 1, 2, 3, 4, 6, 8} |
| 14 | 1110 | 10 | {0, 1, 2, 3, 4, 5, 6, 8} |
| 15 | 1111 | reserved | reserved |

$T_{SFC}$ denotes a cell-specific subframe configuration and $\Delta_{SFC}$ denotes a cell-specific subframe offset. srs-SubframeConfig is provided by a higher layer (e.g., an RRC layer). SRS is transmitted through a subframe satisfying floor $(n_s/2)$ mod $T_{SFC} \in \Delta_{SFC}$. $n_s$ denotes a slot index. floor( ) denotes a flooring function and mod denotes a modulo operation.

Each SRS symbol is generated by basis sequences (e.g., random sequence or ZC (Zero Correlation)-based sequence set) where for a given time instance and bandwidth all the UEs in a cell use a same basis sequence. SRS transmissions from multiple UEs in a same time and band in a cell are distinguished orthogonally by different cyclic shifts of the basis sequence. SRS sequences from different cells can be distinguished by different basis sequences.

FIGS. 5 to 8 show a slot level structure of a PUCCH format. The PUCCH includes the following formats in order to transmit control information.

(1) Format 1: This is used in On-Off Keying (OOK) modulation or Scheduling Request (SR)

(2) Format 1a and Format 1b: These are used in ACK/NACK (Acknowledgment/Negative Acknowledgment)

1) Format 1a: BPSK ACK/NACK of one codeword

2) Format 1b: QPSK ACK/NACK of two codewords (3) Format 2: This is used in QPSK modulation or CQI transmission (4) Format 2a and Format 2b: These are used in CQI and ACK/NACK simultaneous transmission.

Table 2 shows a modulation scheme and the number of bits per subframe according to the PUCCH format. Table 3 shows the number of RSs per slot according to the PUCCH format. Table 4 shows an SC-FDMA symbol position of an RS according to the PUCCH format. In Table 2, the PUCCH format 2/2a/2b corresponds to a normal CP. Unless mentioned otherwise, the PUCCH format 1/1a/1b can be simply referred to a PUCCH format 1. Also unless mentioned otherwise, the PUCCH format 2/2a/2b can be simply referred to a PUCCH format 2.

TABLE 2

| PUCCH format | Modulation scheme | Number of bits per subframe ($M_{bits}$) |
|---|---|---|
| 1 | N/A | N/A |
| 1a1 | BPSK | 1 |
| 1b | QPSK | 2 |

TABLE 2-continued

| PUCCH format | Modulation scheme | Number of bits per subframe ($M_{bits}$) |
|---|---|---|
| 2 | QPSK | 20 |
| 2a | QPSK + BPSK | 21 |
| 2b | QPSK + BPSK | 22 |

TABLE 3

| PUCCH format | Normal cyclic prefix | Extended cyclic prefix |
|---|---|---|
| 1, 1a, 1b | 3 | 2 |
| 2 | 2 | 1 |
| 2a, 2b | 2 | N/A |

TABLE 4

| PUCCH format | SC-FDMA symbol position of RS | |
|---|---|---|
| | Normal cyclic prefix | Extended cyclic prefix |
| 1, 1a, 1b | 2, 3, 4 | 2, 3 |
| 2, 2a, 2b | 1, 5 | 3 |

Figure 5:
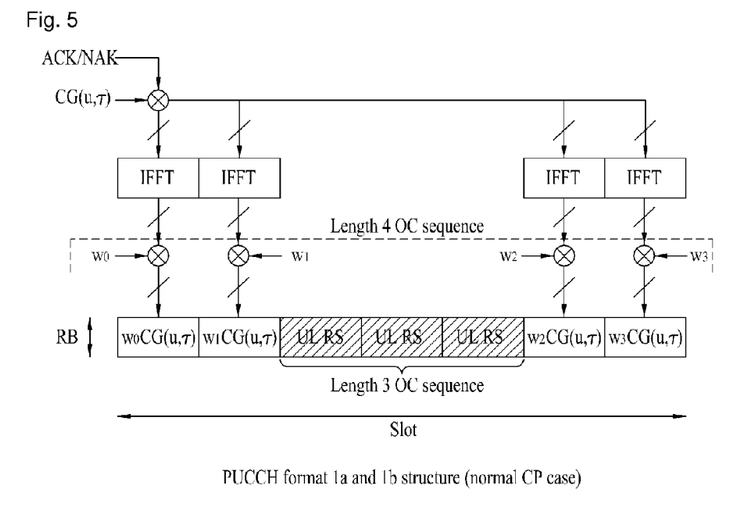
FIGS. 5 to 8 are diagrams showing a slot level structure of a PUCCH format.
Figure 6:
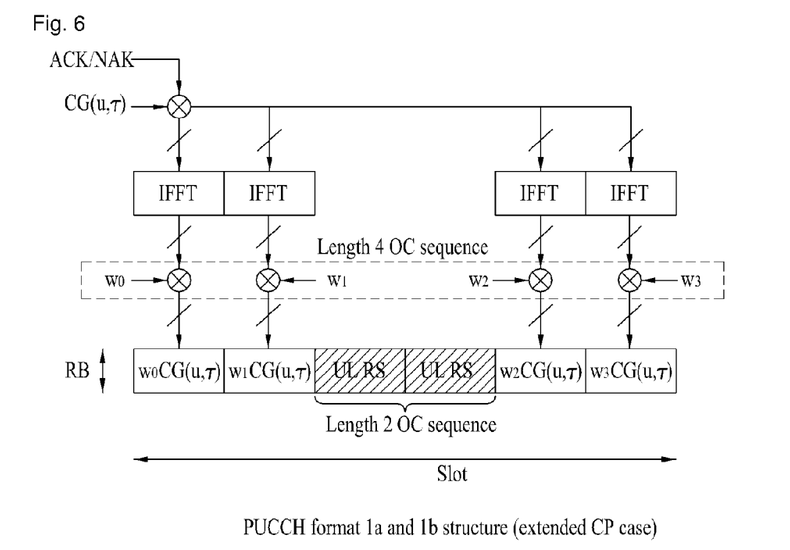

FIG. 5 shows the PUCCH formats 1a and 1b of the normal CP case. FIG. 6 shows the PUCCH formats 1a and 1b of the extended CP case. In the PUCCH formats 1a and 1b, the same control information is repeated within a subframe in slot units. Each UE transmits an ACK/NACK signal through different resources including different Cyclic Shifts (CSs) (frequency domain codes) and Orthogonal Cover (OC) or Orthogonal Cover Code (OCC) (time domain spread code) of Computer-Generated Constant Amplitude Zero Auto Correlation (CG-CAZAC) sequences. Orthogonal sequences w0, w1, w2 and w3 may be applied in an arbitrary time domain (after FFT modulation) or in an arbitrary frequency domain (before FFT modulation). In a semi-persistent scheduling case, ACK/NACK resources including CS, OC and Physical Resource Block (PRB) are semi-statically given to the UE through Radio Resource control (RRC). In dynamic ACK/NACK, ACK/NACK resources may be implicitly given to the UE by a lowest CCE index of a PDCCH corresponding to a PDSCH.

If "ackNackSRSSimultaneousTransmission is allowed (enable) (hereinafter, referred to as "ON") by a higher layer (e.g., RRC), when the ACK/NACK and the SRS are simultaneously transmitted in one subframe, a last SC-FDMA symbol of the subframe is not used for ACK/NACK transmission in order to guard SRS transmission. To this end, a normal PUCCH format 1a/1b is used in a first slot of the subframe, and a shortened PUCCH format 1a/1b is used in a second slot of the subframe. The normal PUCCH format 1a/1b is equal to that shown in FIGS. 5 and 6, and the shortened PUCCH format 1a/1b is resultantly equal to the last SC-FDMA symbol punctured format of FIGS. 5 and 6. Accordingly, in the shortened PUCCH format 1a/1b, for ACK/NACK transmission, OC sequences w0, w1 and w2 of a length 3 are used. In contrast, if "ackNackSRSSimultaneousTransmission" is not allowed (disable) (hereinafter, referred to as "OFF"), SRS transmission is dropped when ACK/NACK and SRS are supposed to be simultaneously transmitted.

Figure 7:
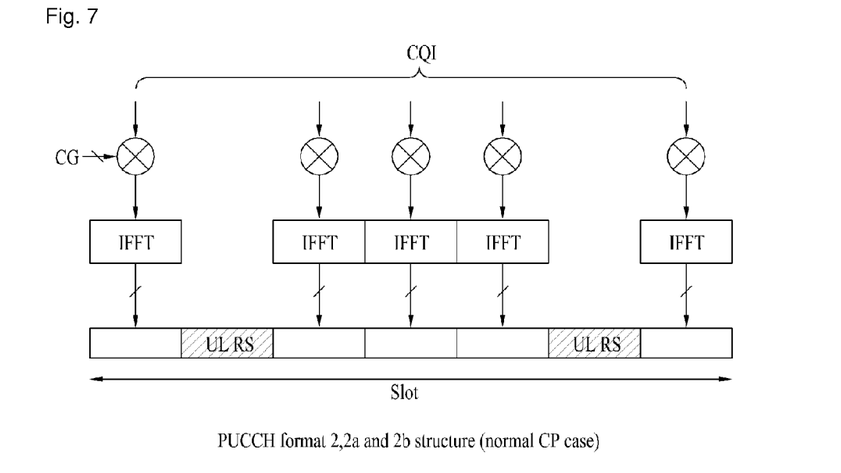
Figure 8:
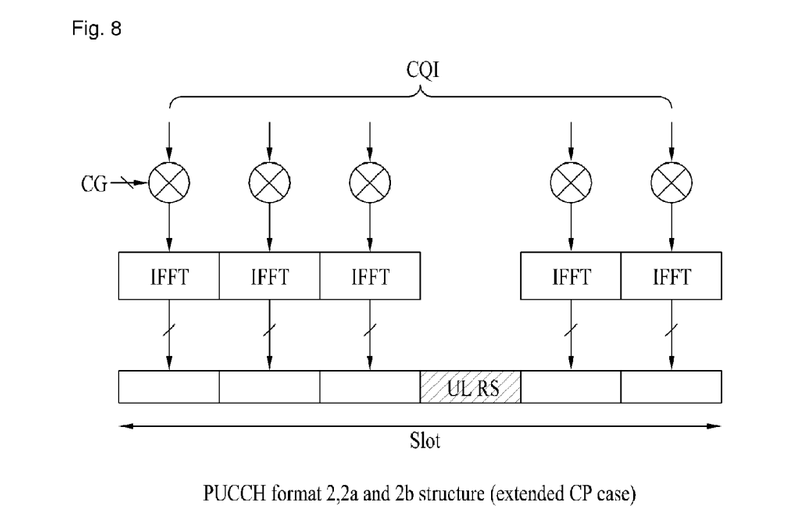

FIG. 7 shows the PUCCH format 2/2a/2b of the normal CP case. FIG. 8 shows the PUCCH format 2/2a/2b of the extended CP case.

Referring to FIGS. 7 and 8, in the normal CP case, one subframe includes RS symbols and 10 QPSK data symbols. Each QPSK symbol is spread in a frequency domain by CS and then mapped to an SC-FDMA symbol. SC-FDMA symbol level CS hopping can be used to randomize inter-cell interference. RS may be multiplexed by CDM using cyclic shift. For example, if it is assumed that the number of available CSs is 12 or 6, 12 or 6 UEs may be multiplexed within the same PRB.

If "ackNackSRSSimultaneousTransmission" is allowed (enable) (hereinafter, referred to as "ON") by a higher layer (e.g., RRC), when the ACK/NACK and the CQI are supposed to be simultaneously transmitted in one subframe, the ACK/NACK and the CQI are transmitted together using an embedded RS scheme or a joint coding scheme. More specifically, in the normal CP case, the ACK/NACK is embedded in a second RS within the slot in the PUCCH format 2a/2b. In contrast, in the extended CP case, the ACK/NACK and the CQI are subjected to joint coding and then are mapped to the PUCCH format 2. If "simultaneousAckNackAndCQI" is OFF, CQI transmission is dropped when the ACK/NACK and the CQI are simultaneously transmitted.

Figure 9:
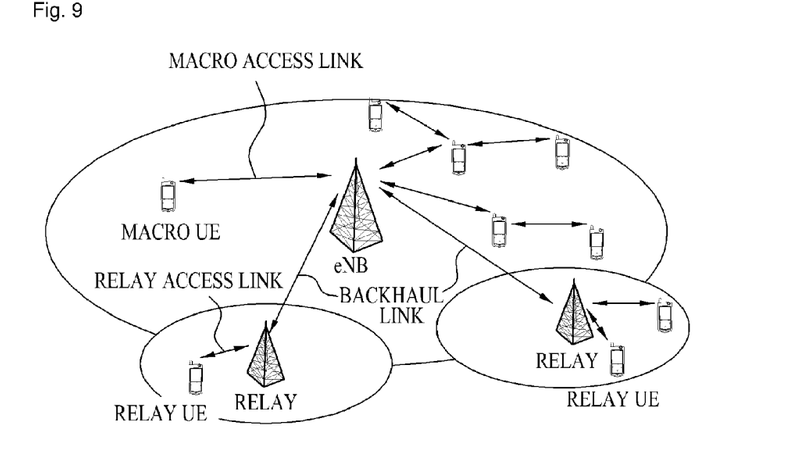
FIG. 9 is a diagram showing a radio communication system having a relay.

FIG. 9 illustrates a wireless communication system having relays. A relay or Relay Node (RN) extends the service area of an eNB or is installed in a shadowing area to thereby provide a reliable service.

Referring to FIG. 8, the wireless communication system includes an eNB, relays, and UEs. The UEs communicate with the eNB or the relays. For the sake of convenience, a UE communicating with an eNB is referred to as a macro UE and a UE communicating with a relay is referred to as a relay UE. A communication link between an eNB and a macro UE and a communication link between a relay and a relay UE are referred to as a macro access link and a relay access link, respectively. A communication link between an eNB and a relay is referred to as a backhaul link.

Relaying is considered as a tool to improve e.g. the coverage of high data rates, group mobility, temporary network deployment, the cell-edge throughput and/or to provide coverage in new areas. The relay node is wirelessly connected to the radio-access network via a donor cell. With respect to the relay node's usage of spectrum, its operation can be classified into:
 inband, in which case the eNB-relay link shares the same carrier frequency with relay-UE links. Rel-8 UEs should be able to connect to the donor cell in this case.
 outband, in which case the eNB-relay link does not operate in the same carrier frequency as relay-UE links. Rel-8 UEs should be able to connect to the donor cell in this case.

With respect to the knowledge in the UE, relays can be classified into
 transparent, in which case the UE is not aware of whether or not it communicates with the network via the relay.
 non-transparent, in which case the UE is aware of whether or not it is communicating with the network via the relay.
 Depending on the relaying strategy, a relay may
 be part of the donor cell
 control cells of its own In the case the relay is part of the donor cell, the relay does not have a cell identity of its own (but may still have a relay ID). At least part of the RRM is controlled by the eNodeB to which the donor cell belongs, while parts of the RRM may be located in the relay. In this case, a relay should preferably support also LTE Rel-8 UEs. Smart repeaters, decode-and-forward relays, different types of L2 relays, and Type 2 relay are examples of this type of relaying.

In the case the relay is in control of cells of its own, the relay controls one or several cells and a unique physical-layer cell identity is provided in each of the cells controlled by the relay. The same RRM (Radio Resource Management) mechanisms are available and from a UE perspective there is no difference in accessing cells controlled by a relay and cells controlled by a "normal" eNodeB. The cells controlled by the relay should support also LTE Rel-8 UEs. Self-backhauling (L3 relay), "Type 1 relay nodes" and "Type 1a relay nodes" use this type of relaying.

At least "Type 1" and "Type 1a" relay nodes are part of LTE-Advanced.

A "Type 1" relay node is an inband relaying node characterized by the following:

It control cells, each of which appears to a UE as a separate cell distinct from the donor cell The cells shall have their own Physical Cell ID (defined in LTE Rel-8) and the relay node shall transmit its own synchronization channels, reference symbols, etc.

In the context of single-cell operation, the UE shall receive scheduling information and HARQ feedback directly from the relay node and send its control channels (SR/CQI/ACK) to the relay node It shall appear as a Rel-8 eNodeB to Rel-8 UEs (i.e. backwards compatible)

To LTE-Advanced UEs, it should be possible for a relay node to appear differently than Rel-8 eNodeB to allow for further performance enhancement.

A "Type 1a" relay node is characterised by the same set of features as the "Type 1" relay node above, except "Type 1a" operates outband.

A "Type 2" relay node is an inband relaying node characterized by the following:

It does not have a separate Physical Cell ID and thus would not create any new cells.

It is transparent to Rel-8 UEs; a Rel-8 UE is not aware of the presence of a Type 2 relay node.

It can transmit PDSCH.

At least, it does not transmit CRS(Cell specific Reference Signal) and PDCCH.

In order to allow inband relaying, some resources in the time-frequency space are set aside for the backhaul link (Un) and cannot be used for the access link (Uu). At least the following scheme will be supported for this resource partitioning:

General principle for resource partitioning at the relay:

eNB→RN and RN→UE links are time division multiplexed in a single carrier frequency (only one is active at any time)

RN→eNB and UE→RN links are time division multiplexed in a single carrier frequency (only one is active at any time)

Multiplexing of backhaul links in FDD:

eNB→RN transmissions are done in the DL frequency band

RN→eNB transmissions are done in the UL frequency band

Multiplexing of backhaul links in TDD:

eNB→RN transmissions are done in the DL subframes of the eNB and RN

RN→eNB transmissions are done in the UL subframes of the eNB and RN

Figure 10:
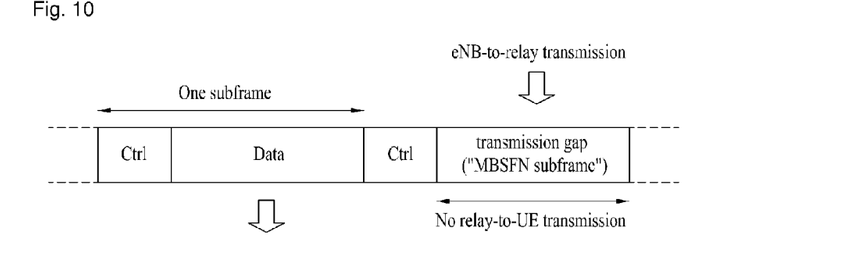
FIG. 10 is a diagram showing backhaul transmission of a Multicast Broadcast Single Frequency Network (MBSFN) subframe.

FIG. 10 illustrates an exemplary backhaul transmission in a Multicast Broadcast Single Frequency Network (MBSFN) subframe. For in-band relaying, an eNB-to-relay link (i.e. a backhaul link) operates in the same frequency band as a relay-to-UE link (i.e. a relay access link). In the case where a relay transmits a signal to a UE while it is receiving a signal from an eNB or vice versa, the transmitter and receiver of the relay interfere mutually. Accordingly, simultaneous eNB-to-relay and relay-to-UE transmissions on the same frequency resources may be limited. For this purpose, the backhaul link and the relay access link are partitioned in Time Division Multiplexing (TDM). In the LTE-A system, a backhaul link is established in an MBSFN subframe to support measurements of legacy LTE UEs located in a relay zone (fake MBSFN). If a subframe is signaled as an MBSFN subframe, a UE receives only the control region (ctrl) of the subframe and thus the relay may configure a backhaul link using the data region of the subframe.

EXAMPLE

Due to DL transmission, CQI period, non-periodic CQI scheduling, SRS period, dynamic SRS, etc., ACK/NACK, CQI and SRS may be scheduled to be transmitted in the same subframe. Here, CQI is an example of channel quality information and the channel quality information includes at least one of CQI, PMI and RI. If an uplink simultaneous transmission situation occurs in the related art, transmission of a specific uplink signal is dropped or uplink signals are simultaneously transmitted in the same subframe, according to a "simultaneousAckNackAndCQI" mode and a "ackNackSRSSimultaneousTransmission" mode set by a higher layer (e.g., RRC) (signal). In the related art, if an ACK/NACK, CQI and SRS simultaneous transmission situation occurs, even when a "simultaneousAckNackAndCQI" mode and an "ackNackSRSSimultaneousTransmission" mode are both ON, ACK/NACK embedded CQI (PUCCH format 2) transmission is dropped. That is, in the related art, since ACK/WO NACK and CQI transmission is dropped regardless of mode setting when the ACK/NACK, CQI and SRS simultaneous transmission situation occurs, unnecessary retransmission is performed and the eNB may not appropriately apply the change of the channel state upon scheduling. In addition, the (ON, ON) mode setting of the related art may be regarded as misconfiguration in light of the uplink transmission procedure of the related art.

The ACK/NACK, CQI and SRS simultaneous transmission situation may be avoided by the scheduler. However, such scheduling limitation lowers flexibility of CQI and SRS configuration. In addition, the above-described simultaneous transmission situation may not be avoided even by the scheduler.

Hereinafter, the present invention proposes a procedure for efficiently performing uplink transmission in the case where an ACK/NACK, CQI and SRS simultaneous transmission situation occurs, and a PUCCH format therefore. More particularly, the present invention proposes a method of efficiently performing uplink transmission if a subframe in which the ACK/NACK is embedded in the CQI and a subframe in which SRS transmission is configured overlap, and a PUCCH format therefore.

First, the procedure for uplink transmission in the case where the ACK/NACK, CQI and SRS simultaneous transmission situation occurs will be described according to setting of an "ackNackSRSSimultaneousTransmission" mode and a "simultaneousAckNackAndCQI" mode. In the following description, (ON/OFF, ON/OFF) respectively indicate whether the "ackNackSRSSimultaneousTransmission" mode and the "simultaneousAckNackAndCQI" mode are ON/OFF.

First, an uplink transmission procedure according to mode setting in the case where an ACK/NACK, CQI and SRS simultaneously transmission situation occurs will be described for a relay. For convenience, in a UL backhaul link, it is assumed that the relay uses a shortened subframe (that is, a subframe in which a last SC-FDMA symbol is punctured). In the case where the relay may use a normal subframe in a UL backhaul link, the operation of the relay is equal or similar to the below-described operation of the UE.

In the case where a shortened subframe is used in a UL backhaul link, the relay may perform the following operation according to mode setting. In the following description, it is assumed that the shortened ACK/NACK is transmitted using the shortened PUCCH format 1 and the shortened ACK/NACK and CQI is transmitted using the PUCCH format proposed by the present invention. The PUCCH format proposed by the present invention will be described in greater detail below with reference to FIG. 11.

Procedure 1: (OFF, OFF)
RN transmits shortened ACK/NACK only, while RN drops SRS and CQI
Procedure 2-1: (OFF, ON)
RN transmits shortened ACK/NACK only, while RN drops SRS and CQI
Procedure 2-2: (OFF, ON)
RN transmits shortened ACK/NACK+CQI ("A/N embedded CQI"), while RN drops SRS
Procedure 3: (ON, OFF)
RN transmits shortened ACK/NACK only, while RN drops SRS and CQI
Procedure 4-1: (ON, ON)
RN transmits shortened ACK/NACK only, while RN drops SRS and CQI
Procedure 4-2: (ON, ON)
RN transmits shortened ACK/NACK+CQI ("A/N embedded CQI"), while RN drops SRS Table 5 shows the above-described procedure of the relay.

TABLE 5

| ackNackSRSSimultaneousTransmission | simultaneousAckNackAndCQI | |
|---|---|---|
| | OFF | ON |
| OFF | (1) Shortened A/N only, SRS dropping CQI dropping | (2-1) Shortened A/N only, SRS dropping, CQI dropping (2-2) Shortened A/N embedded CQI, SRS dropping |
| ON | (3) Shortened A/N only SRS dropping CQI dropping | (4-1) Shortened A/N only, SRS dropping, CQI dropping (4-2) Shortened A/N embedded CQI, SRS dropping |

Next, an uplink transmission procedure according to mode setting in the case where an ACK/NACK, CQI and SRS simultaneous transmission situation occurs will be described for a UE. In the UE case, a normal subframe or a shortened subframe may be selectively used in a UL access link according to a simultaneous transmission scenario. The operation of the UE is equal or similar to the operation of the relay which can use the normal subframe in a UL backhaul link.

The UE may perform the following operations according to setting of "ackNackSRSSimultaneousTransmission" mode and "simultaneousAckNackAndCQI" mode. In the following description, it is assumed that the shortened ACK/NACK is transmitted using the shortened PUCCH format 1 and the shortened ACK/NACK and CQI is transmitted using the PUCCH format 2 proposed by the present invention. The PUCCH format proposed by the present invention will be described in greater detail below with reference to FIG. 11.

Procedure 1: (OFF, OFF)
UE transmits shortened ACK/NACK only, while UE drops SRS and CQI
Procedure 2-1: (OFF, ON)
UE transmits shortened ACK/NACK only, while UE drops SRS and CQI
Procedure 2-2: (OFF, ON)
UE transmits shortened ACK/NACK+CQI ("A/N embedded CQI"), while UE drops SRS
Procedure 3-1: (ON, OFF)
UE transmits shortened ACK/NACK only, while UE drops SRS and CQI
Procedure 3-2: (ON, OFF)
UE transmits shortened ACK/NACK, and SRS, while UE drops CQI
Procedure 4-1: (ON, ON)
UE transmits shortened ACK/NACK only, while UE drops SRS and CQI
Procedure 4-2: (ON, ON)
UE transmits shortened ACK/NACK+CQI ("A/N embedded CQI"), while UE drops SRS
Procedure 4-3: (ON, ON)
UE transmits shortened ACK/NACK+CQI ("A/N embedded CQI"), and SRS Table 6 shows the above-described procedure of the UE.

TABLE 6

| ackNackSRSSimultaneousTransmission | simultaneousAckNackAndCQI | |
|---|---|---|
| | OFF | ON |
| OFF | (1) Shortened A/N only, SRS dropping CQI dropping | (2-1) Shortened A/N only, SRS dropping, CQI dropping (2-2) Shortened A/N embedded CQI, SRS dropping |
| ON | (3-1) Shortened A/N only SRS dropping CQI dropping (3-2) Shortened A/N, and SRS CQI dropping | (4-1) Shortened A/N only, SRS dropping, CQI dropping (4-2) Shortened A/N embedded CQI, SRS dropping (4-3) Shortened A/N embedded CQI, and SRS |

Figure 11:
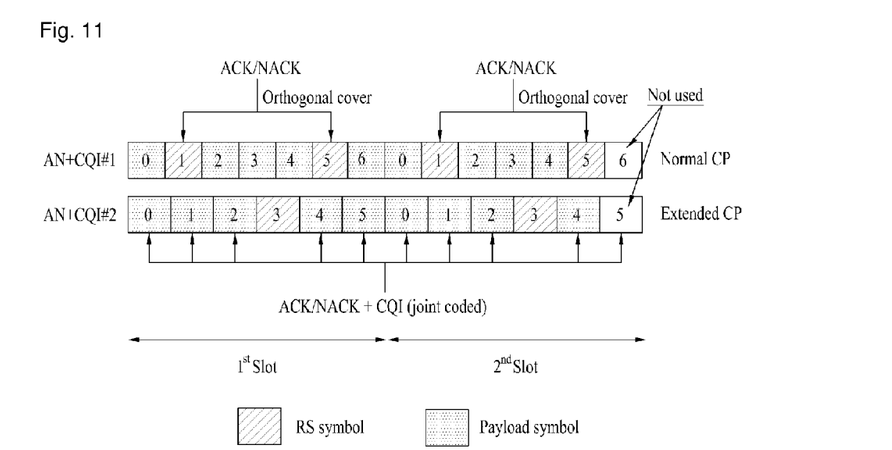
FIG. 11 is a diagram showing ACK/NACK and CQI simultaneous transmission according to an embodiment of the present invention.

FIG. 11 shows a method of simultaneously transmitting the ACK/NACK and the CQI using the shortened PUCCH format according to an embodiment of the present invention. For convenience, although the structure of the PUCCH format 2 shown in FIGS. 7 and 8 is used, it is only exemplary and the PUCCH format for the ACK/NACK and CQI simultaneous transmission is not limited thereto. The CQI is an example of the channel quality information and the channel quality information includes at least one of CQI, PMI and RI.

Referring to FIG. 11, in the PUCCH format proposed by the present invention, unlike the conventional PUCCH format 2, the last SC-FDMA symbol of the subframe is not used upon ACK/NACK and CQI simultaneous transmission (that is, ACK/NACK embedded CQI transmission). In the present example, the last SC-FDMA symbol of the subframe is not used in order to enable the UE to transmit an SRS, protect SRS transmission of another UE (or relay), or due to design a Uu (RN-UE) and Un (eNB-RN) link. For convenience, the ACK/NACK and CQI simultaneous transmission scheme according to the present example can be referred to as a shortened A/N embedded CQI, and the PUCCH format proposed by the present invention can be referred to as a shortened PUCCH format 2 in order to be distinguished from the conventional PUCCH format 2. Here, the shortened PUCCH format 2 may indicate the entire PUCCH structure of the subframe or only the slot-level PUCCH structure of a second slot according to context.

Signal transmission using the shortened PUCCH format 2 will be described in greater detail. It is assumed that both "ackNackSRSSimultaneousTransmission" mode and "simultaneousAckNackAndCQI" mode are ON. At this time, if an ACK/NACK, CQI and SRS simultaneous transmission situation occurs, that is, if a subframe for ACK/NACK and CQI simultaneous transmission is corresponding to a subframe in which SRS transmission is configured (e.g., a cell-specific SRS subframe by srsSubframe-Configuration), the ACK/NACK and CQI simultaneous transmission is performed using a normal PUCCH format 2 (first slot) and a proposed shortened PUCCH format 2 (second slot). In this case, the last SC-FDMA symbol of the subframe is used to transmit its own SRS or is not used for signal transmission in order to protect the SRS of another UE (or relay). In contrast, if the subframe for the ACK/NACK and CQI simultaneous transmission is corresponding to a subframe in which SRS transmission is not configured (that is, only the ACK/NACK and CQI simultaneous transmission situation occurs), the ACK/NACK and CQI simultaneous transmission is performed using the normal PUCCH format 2 (first slot) and the normal PUCCH format 2 (second slot) according to the conventional procedure.

The proposed shortened PUCCH format 2 may be implemented using various schemes. For example, control information may be mapped to the normal PUCCH format 2 and then the last SC-FDMA symbol of the second slot may be punctured (puncturing after mapping) or control information may be rate-matched in consideration of the shortened PUCCH format 2 and then may be mapped to the payload symbol of the shortened PUCCH format 2 (mapping after rate matching). In addition, embedding the ACK/NACK in the CQI in the shortened PUCCH format 2 may be implemented using various schemes. For example, the CQI may be mapped to the payload symbol of the PUCCH format 2 and the ACK/NACK may be multiplexed with RS symbols of the PUCCH format 2. More specifically, in the normal CP case, since two RS symbols are present within one slot, the ACK/NACK may be multiplexed with the two RS symbols within the slot using an orthogonal cover (e.g., a Walsh cover) of length 2. For example, in the ACK case, the RS symbols within the slot are multiplied by [a a] (e.g., [1 1], [j j]) in SC-FDMA symbol units and, in the NACK case, the RS symbols are multiplied by [−a a] or [a-a] (AN+CQI#1). Similarly, in the extended CP case, since two RS symbols are present within one subframe, the ACK/NACK may be multiplexed with the two RS symbols within the subframe using orthogonal cover (e.g., a Walsh cover) of length 2. Only, in the extended CP case, since the amount of ACK/NACK (or ACK/NACK iteration number) that can be multiplexed on the RS symbols is limited, another scheme may be considered for ACK/NACK and CQI simultaneous transmission. For example, the ACK/NACK bit(s) and the CQI bit(s) may be coded together at a source bit level (that is, joint coding). Thereafter, the joint-coded ACK/NACK and CQI bits may be subjected to demodulation, scrambling, etc., and then are mapped to the payload symbols of the PUCCH format 2 (AN+CQI#2).

Although FIG. 11 shows the case where the last SC-FDMA of the second slot is not used for PUCCH transmission upon ACK/NACK and CQI simultaneous transmission, this is only exemplary and, for example, a specific SC-FDMA symbol (e.g., a first SC-FDMA symbol) in a first slot may not be used for PUCCH transmission for ACK/NACK and CQI simultaneous transmission according to Uu (RN-UE) and Un (eNB-RN) link design.

Figure 12:
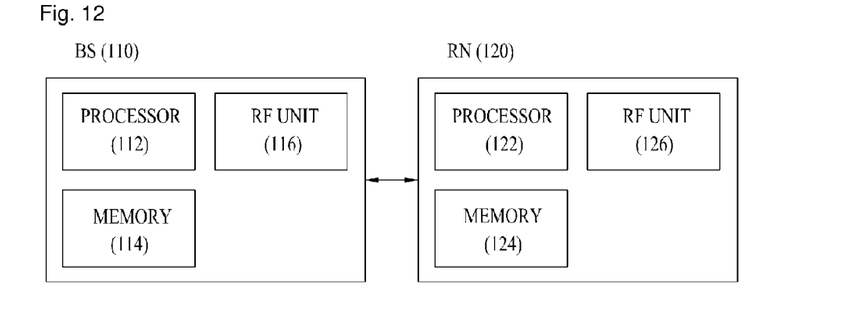
FIG. 12 is a diagram showing a base station and a user terminal applicable to an embodiment of the present invention.

FIG. 12 is a diagram illustrating a base station and a user equipment, which can be applied to the embodiment of the present invention. Relay functions as the base station or the user equipment, so it is not illustrated.

Referring to FIG. 12, the wireless communication system includes a base station (BS) 110 and a user equipment (UE) 120. The base station 110 includes a processor 112, a memory 114, and a radio frequency (RF) unit 116. The processor 112 can be configured to implement procedures and/or methods suggested in the present invention. The memory 114 is connected with the processor 112 and stores various kinds of information related to the operation of the processor 112. The RF unit 116 is connected with the processor 112 and transmits and/or receives a radio signal. The user equipment 120 includes a processor 122, a memory 124, and a radio frequency (RF) unit 126. The processor 122 can be configured to implement procedures and/or methods suggested in the present invention. The memory 124 is connected with the processor 122 and stores various kinds of information related to the operation of the processor 122. The RF unit 126 is connected with the processor 122 and transmits and/or receives a radio signal. The base station 110 and/or the user equipment 120 may have a single antenna or multiple antennas.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention have been described based on the data transmission and reception between the base station and the user equipment. A specific operation which has been described as being performed by the base station may be performed by an upper node of the base station as the case may be. In other words, it will be apparent that various operations performed for communication with the user equipment in the network which includes a plurality of network nodes along with the base station can be performed by the base station or network nodes other than the base station. The base station may be replaced with terms such as a fixed station, Node B, eNode B (eNB), and access point. Also, the user equipment may be replaced with terms such as mobile station (MS) and mobile subscriber station (MSS).

The embodiments according to the present invention can be implemented by various means, for example, hardware, firmware, software, or their combination. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

Industrial Applicability

The present invention can be used in wireless communication apparatuses such as a user equipment, a relay station, a base station and the like.

The invention claimed is:

1. A method of transmitting control information via a physical uplink control channel (PUCCH) in a wireless communication system, the method comprising:
generating, by a user equipment (UE), channel quality information and acknowledgement/negative acknowledgement (ACK/NACK) information; and
transmitting, by the UE, the channel quality information and the ACK/NACK information together via the PUCCH at a subframe, the subframe including a plurality of single carrier frequency division multiple access (SC-FDMA) symbols,
wherein, when a next subframe of the subframe is configured for a communication between a relay and a base station, a last SC-FDMA symbol of the subframe is not used for transmission of the PUCCH and a sounding reference signal (SRS) is dropped in the subframe even when a simultaneous transmission of the SRS and the ACK/NACK information is configured to be ON, and
wherein a same frequency band is used for both a communication between the UE and the relay and the communication between the relay and the base station.

2. The method of claim 1, wherein the channel quality information includes at least one of channel quality indicator (CQI), precoding matrix indicator (PMI) and rank indication (RI).

3. The method of claim 1, further comprising:
joint coding the channel quality information and the ACK/NACK information; and
mapping the joint coded information to SC-FDMA symbols of the PUCCH.

4. The method of claim 1, wherein the ACK/NACK information is embedded in one or more SC-FDMA symbols for reference signal on the PUCCH.

5. The method of claim 1, wherein the channel quality information and the ACK/NACK information is transmitted together via PUCCH format 2.

6. A user equipment configured to transmit control information via a physical uplink control channel (PUCCH) in a wireless communication system, the user equipment comprising:
a radio frequency (RF) unit; and
a processor operatively connected to the RF unit and configured to:
generate channel quality information and acknowledgement/negative acknowledgement (ACK/NACK) information, and
transmit the channel quality information and the ACK/NACK information together via the PUCCH at a subframe, the subframe including a plurality of single carrier frequency division multiple access (SC-FDMA) symbols,
wherein, when a next subframe of the subframe is configured for a communication between a relay and a base station, a last SC-FDMA symbol of the subframe is not used for transmission of the PUCCH and a sounding reference signal fSRS) is dropped in the subframe even when a simultaneous transmission of the SRS and the ACK/NACK information is configured, and
wherein a same frequency band is used for both a communication between the user equipment and the relay and the communication between the relay and the base station.

7. The user equipment of claim 6, wherein the channel quality information includes at least one of channel quality indicator (CQI), precoding matrix indicator (PMI) and rank indication (RI).

8. The user equipment of claim 6, wherein the processor is further configured to joint code the channel quality information and the ACK/NACK information, and to map the joint coded information to SC-FDMA symbols of the PUCCH.

9. The user equipment of claim 6, wherein the ACK/NACK information is embedded in one or more SC-FDMA symbols for reference signal on the PUCCH.

10. The user equipment of claim 6, wherein the channel quality information and the ACK/NACK information is transmitted together via PUCCH format 2.

* * * * *